US012797947B2

(12) United States Patent

Chen et al.

(10) Patent No.: US 12,797,947 B2

(45) Date of Patent: Nov. 17, 2026

(54) MANUFACTURING METHOD AND MANUFACTURING DEVICE OF AMORPHOUS NANOCRYSTALLINE COMPOSITE MATERIALS

(71) Applicant: Nanchang Hangkong University, Nanchang (CN)

(72) Inventors: Yuhua Chen, Nanchang (CN); Jilin Xie, Nanchang (CN); Timing Zhang, Nanchang (CN); Shanlin Wang, Nanchang (CN); Shiyi Zhang, Nanchang (CN); Jinyang Hu, Nanchang (CN); Limeng Yin, Nanchang (CN); Gang Wang, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 503 days.

(21) Appl. No.: 18/359,899

(22) Filed: Jul. 27, 2023

(65) Prior Publication Data

US 2024/0342788 A1 Oct. 17, 2024

(30) Foreign Application Priority Data

Apr. 12, 2023 (CN) ......................... 202310385579.7

(51) Int. Cl.
*B22D 23/00* (2006.01)
*B22F 10/22* (2021.01)
(Continued)

(52) U.S. Cl.
CPC ............ *B22D 23/003* (2013.01); *B22F 10/22* (2021.01); *B33Y 10/00* (2014.12); *B33Y 30/00* (2014.12)

(58) Field of Classification Search
CPC ........ B22D 23/003; B22F 10/22; B22F 3/006; B22F 12/50; B22F 3/003; B22F 12/00;
(Continued)

(56) References Cited

U.S. PATENT DOCUMENTS

| | | | | |
|---|---|---|---|---|
| 5,225,004 A * | 7/1993 | O'Handley | ............ | B22F 3/115 148/540 |
| 10,232,443 B2 * | 3/2019 | Myerberg | ............... | B22F 12/55 |

(Continued)

FOREIGN PATENT DOCUMENTS

| | | | | |
|---|---|---|---|---|
| KR | 20190011357 | * 2/2019 | ............ | B33Y 70/00 |

OTHER PUBLICATIONS

KR20190011357, Lee et al., Method Of High Resolution 3D Printing Using Micro Metal Wire, Feb. 7, 2019 (Year: 2019).*

*Primary Examiner* — Jessee R Roe
*Assistant Examiner* — Michael Aboagye
(74) *Attorney, Agent, or Firm* — JEEN IP LAW, LLC

(57) ABSTRACT

A manufacturing method of amorphous nanocrystalline composite materials includes following steps: S1, transferring raw materials through a feeding mechanism; S2, generating metal droplets from the raw materials under an action of one of an electric spark and an electric arc through a pulse power supply; S3, transporting the metal droplets below a flying plate under an action of a transmission medium; S4, generating a magnetic field force through electromagnetic pulse coils disposed on the flying plate to drive the flying plate to impact the metal droplets onto surfaces of substrates; S5, repeating the S1 to S4, thereby forming dense amorphous nanocrystalline composite materials. The pulse power supply is utilized to generate the metal droplets from the raw materials under the action of the
(Continued)

electric spark or the short electric arc, and then the metal droplets are formed to the dense amorphous nanocrystalline composite materials.

12 Claims, 3 Drawing Sheets

(51) Int. Cl.
*B33Y 10/00* (2015.01)
*B33Y 30/00* (2015.01)

(58) Field of Classification Search
CPC ......... B33Y 10/00; B33Y 30/00; B82Y 40/00; C22C 2200/02; C22C 2200/04
USPC .......................................................... 222/594
See application file for complete search history.

(56) References Cited

U.S. PATENT DOCUMENTS

| | | | | |
|---|---|---|---|---|
| 10,464,168 | B2 * | 11/2019 | Matthews ............ | B23K 26/211 |
| 11,654,512 | B2 * | 5/2023 | Dogru ................... | B29C 64/314 219/50 |

* cited by examiner

MANUFACTURING METHOD AND MANUFACTURING DEVICE OF AMORPHOUS NANOCRYSTALLINE COMPOSITE MATERIALS

TECHNICAL FIELD

The disclosure relates to the technical field of additive manufacturing, and particularly to a manufacturing method and a manufacturing device of amorphous nanocrystalline composite materials.

BACKGROUND

Additive manufacturing (also referred to as three-dimensional printing, abbreviated as 3D printing) technology is a process of layering materials one by one to create objects based on 3D computer-aided design (CAD) model data. It integrates multiple disciplines such as CAD technology, computer-aided manufacturing (CAM) technology, computer numerical control (CNC) technology, and material processing, and has gradually become a hot and key technology for research in various countries around the world in recent years. As one of the representative technologies of the third industrial revolution, because of no mold, realization of complex design and high forming accuracy, it has received widespread attention from the industrial and commercial circles.

Nanocrystals, due to its unique structure and size effects, have excellent properties that are difficult to obtain from ordinary materials, such as high wear resistance and high-temperature oxidation resistance. In recent years, with the rapid development of nanomaterials, nanotechnology has begun to be applied in many fields such as additive manufacturing and surface engineering.

Amorphous alloys, also known as metallic glasses, have an atomic stacking structure similar to that of liquid metals and are topologically disordered in three-dimensional space due to the avoidance of crystallization during rapid solidification. Compared with traditional crystalline alloys, amorphous alloys have no long-range disordered atomic arrangement, uniform microstructure, no inherent defects such as grain boundaries, dislocations, impurities, etc., and have more excellent mechanical, physical and chemical properties than conventional crystalline materials, such as extremely high strength, hardness, fracture toughness, good wear resistance, corrosion resistance, superplasticity in supercooled liquid region, and excellent soft magnetic property. It makes the amorphous alloys show broad application prospects in fields such as machinery, electronics, medicine, aviation, and chemical engineering.

A Chinese patent with publication No. CN106461365A discloses a high-speed impact large-area prepared amorphous and nanocrystalline composite coating and a preparation process thereof. The steps are as follows: step 1, selections of a substrate and a flying plate: a thickness of the substrate is greater than or equal to 3 millimeters (mm) and less than 10 mm, a thickness of the flying plate is greater than 0.2 mm and less than 1 mm, and the flying plate is processed with a through hole with a diameter less than 0.5 mm; step 2, a surface of the substrate is pickled and polished to remove a surface oxide film, and the treated substrate is cleaned using absolute ethanol and then dried; and step 3, the flying plate and the substrate are arranged in a manner where the flying plate is under the substrate, an electromagnetic pulse device is turned on to make a current through an electromagnetic pulse coil to generate an electromagnetic force, a speed and an angle of the flying plate hitting the substrate are changed by changing a discharge energy and initial spacing of the electromagnetic pulse device to make the flying plate collide with the substrate at high speed and cause lattice deformation and fragmentation on the surface of the substrate, so that amorphous nanocrystalline composite materials are formed on the surface of the substrate.

During the preparation process of the large-area amorphous and nanocrystalline composite coating in the patent, there is no materials between the flying plate and the substrate, and local connections will occur between the flying plate and the substrate.

SUMMARY

To address the shortcomings in the related art, the disclosure provides a manufacturing method and a manufacturing device of amorphous nanocrystalline composite materials, which utilizes a pulse power supply to generate metal droplets from raw materials under an action of one of an electric spark and a short electric arc, and the raw materials are transported below flying plate under an action of a transmission medium. Electromagnetic pulse coils disposed on the flying plate generate a magnetic field force to drive the flying plate to impact the metal droplets onto surfaces of substrates at a high speed to form dense amorphous nanocrystalline composite materials.

To achieve the above objectives, the disclosure provides the following technical solutions as follows.

Specifically, a manufacturing method for amorphous nanocrystalline composite materials includes steps as follows:

- S1, transferring raw materials through a feeding mechanism;
- S2, generating metal droplets from the raw materials under an action of one of an electric spark and a short electric arc through a pulse power supply;
- S3, transporting the metal droplets below a flying plate under an action of a transmission medium;
- S4, generating a magnetic field force through electromagnetic pulse coils disposed on the flying plate to drive the flying plate to impact the metal droplets onto surfaces of the substrates;
- S5, repeating the step 1 to the step 4, thereby forming dense amorphous nanocrystalline composite materials.

The disclosure also provides a manufacturing device of amorphous nanocrystalline composite materials, which includes the pulse power supply, the substrates, the flying plate, a transmission medium channel, and the feeding mechanism.

The pulse power supply is used to generate the metal droplets from the raw materials under the action of the one of the electric spark and the short electric arc, the substrates are arranged on both sides of the raw materials, the flying plate is disposed above the substrates, the transmission medium channel is used to allow the transmission medium to pass through, the transmission medium is used to transport the metal droplets below the flying plate, the feeding mechanism is used to transfer the raw materials, the flying plate is provided with the electromagnetic pulse coils thereon, the electromagnetic pulse coils generate the magnetic field force to drive the flying plate to impact the metal droplets onto the surfaces of the substrates, thereby forming the dense amorphous nanocrystalline composite materials.

In an embodiment, the manufacturing device includes rotating electrodes and a driving assembly used to drive the rotating electrodes.

In an embodiment, two ends of the pulse power supply are correspondingly connected to the rotating electrodes, the metal droplets are generated under the action of the one of the electric spark and the short electric arc formed between the raw materials and the rotating electrodes.

In an embodiment, the two ends of the pulse power supply are correspondingly connected to two different raw materials, and the metal droplets are generated by the action of the one of the electric spark and the short electric arc formed between the two different raw materials.

In an embodiment, the transmission medium is one of gas, a mixture of gas and powder, and a mixture of gas and liquid.

In an embodiment, an outside of the rotating electrodes are sleeved with an insulator layers.

In an embodiment, the manufacturing device includes a shell, the rotating electrodes are disposed inside the shell through support shafts.

In an embodiment, flexible connectors are arranged between the flying plate and the shell.

In an embodiment, the driving assembly includes a driving motor, the driving motor drives the rotating electrodes to rotate through a tapered tooth structure, and the driving motor is fixed to the shell.

In an embodiment, the transmission medium channel is provided with a valve.

The disclosure has the following beneficial effects.

The disclosure provides a manufacturing method and a manufacturing device of amorphous nanocrystalline composite materials, the disclosure utilizes the pulse power supply to generate the metal droplets from the raw materials under the action of one of the electric spark and the short electric arc, and the metal droplets are transported below the flying plate under the action of the transmission medium, the electromagnetic pulse coils disposed on the flying plate generate the magnetic field force to drive the flying plate to impact the metal droplets onto the surfaces of the substrates, thereby forming the dense amorphous nanocrystalline composite materials, then the metal droplets on the substrates form an amorphous structure. Compared with the related art in which a flying plate is utilized to directly impact a substrate, an amorphous structure is observed on the surface of the substrate, but there are no raw materials in a middle between the flying plate and the substrate, which may cause a local connection between the flying plate and the substrate, the technical principle of the manufacturing method and the manufacturing device of the disclosure is different from the related art and can effectively avoid the local connection between the flying plate and the substrate.

Figure 1:
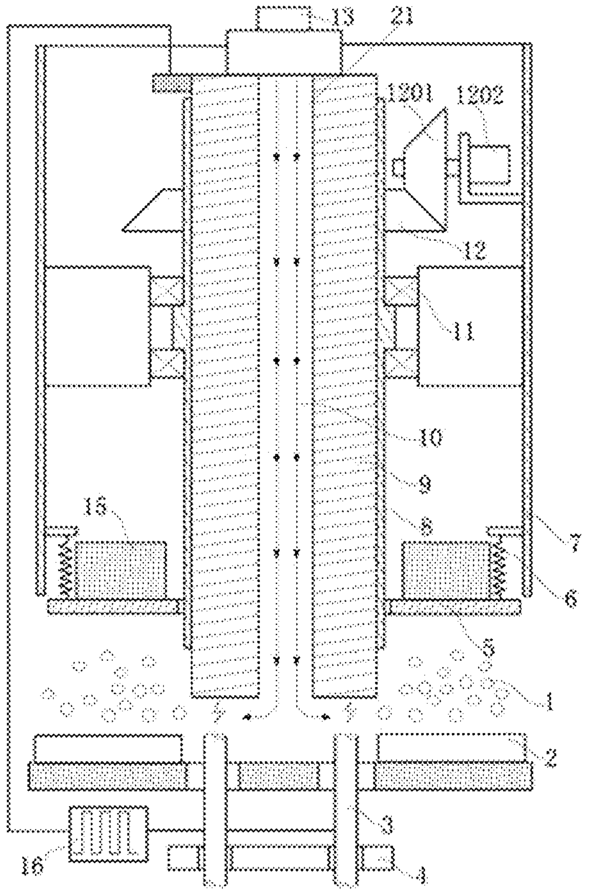
FIG. 1 is a schematic structural diagram showing metal droplets generated by an action of one of an electric spark and a short electric arc formed between raw materials and rotating electrodes in the disclosure.
Figure 2:
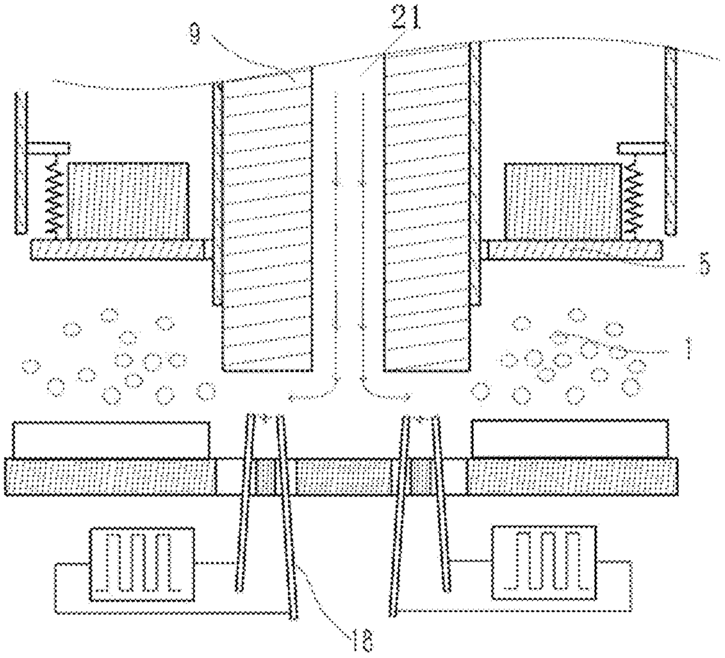
FIG. 2 is a schematic structural diagram showing metal droplets generated by an action of one of an electric spark and a short electric arc formed by two different raw materials in the disclosure.

Description of reference numerals: 1. metal droplet; 2. substrate; 3. raw materials; 4. feeding mechanism; 5. flying plate; 6. flexible connector; 7. shell; 8. insulator layer; 9. rotating electrode; 10. transmission medium; 11. support shaft; 12. second bevel gear; 1201. first bevel gear; 1202. driving motor; 13. valve; 15. electromagnetic pulse coil 16. pulse power supply; 17. bar materials; 18. wire materials; 19. powder; 20. liquid; 21. transmission medium channel.

DETAILED DESCRIPTION OF EMBODIMENTS

Technical solutions in embodiments of the disclosure can be clearly and completely described below in conjunction with the accompanying drawings in the embodiments of the disclosure, and it is clear that the described embodiments are only a part of the embodiments of the disclosure, and not all of them. Based on the embodiments in the disclosure, all other embodiments obtained by those skilled in the art without making creative labor fall within the scope of protection of the disclosure.

Referring to FIGS. 1 to 6, a manufacturing method of amorphous nanocrystalline composite materials includes the following steps:

S1, transferring raw materials through a feeding mechanism 4;

S2, generating metal droplets from the raw materials under an action of one of an electric spark and a short electric arc through a pulse power supply 16;

S3, transporting the metal droplets below a flying plate 5 under an action of a transmission medium 10;

S4, generating a magnetic field force through electromagnetic pulse coils 15 disposed on the flying plate 5 to drive the flying plate 5 to impact the metal droplets onto surfaces of substrates 2; and S5, repeating the S1 to S4, thereby forming dense amorphous nanocrystalline composite materials.

The embodiment of the disclosure provides a manufacturing device suitable for the manufacturing method of amorphous nanocrystalline composite materials, which includes the in pulse power supply 16, the substrates 2, the flying plate 5, a transmission medium channel 21 and the feeding mechanism 4.

The pulse power supply 16 is used to generate the metal droplets from the raw materials under the action of one of the electric spark and the short electric arc, the substrates 2 are arranged on both sides of the raw materials, the flying plate 5 is disposed above the substrates 2, the transmission medium channel 21 is used to allow the transmission medium 10 to pass through, the transmission medium 10 is used to transport the metal droplets below the flying plate 5, the feeding mechanism 4 is used to transfer the raw materials, the flying plate 5 is provided with the electromagnetic pulse coils 15, the electromagnetic pulse coils 15 generate a magnetic field force to drive the flying plate 5 to impact the metal droplets onto surfaces of the substrates 2, thereby forming the dense amorphous nanocrystalline composite materials.

The manufacturing device includes rotating electrodes 9 and a driving assembly used to drive the rotating electrodes 9, and the rotating electrodes 9 are sleeved with an insulator layer 8

Two ends of the pulse power supply 16 are correspondingly connected to the raw materials 3 and the rotating electrodes 9, the metal droplets 1 are generated under the action of the one of the electric spark and the short electric arc formed between the raw materials 3 and the rotating electrodes 9. The purpose of connecting the two ends of the pulse power supply 16 to the raw materials 3 and the rotating electrodes 9 is to form the one of the electric spark and the short electric arc between the rotating electrodes 9 and the raw materials 3, thereby generating the metal droplets 1.

The two ends of the pulse power supply 16 are correspondingly connected to two different raw materials, and the metal droplets are generated by the action of the one of the electric spark and the short electric arc formed between the two different raw materials.

Figure 4:
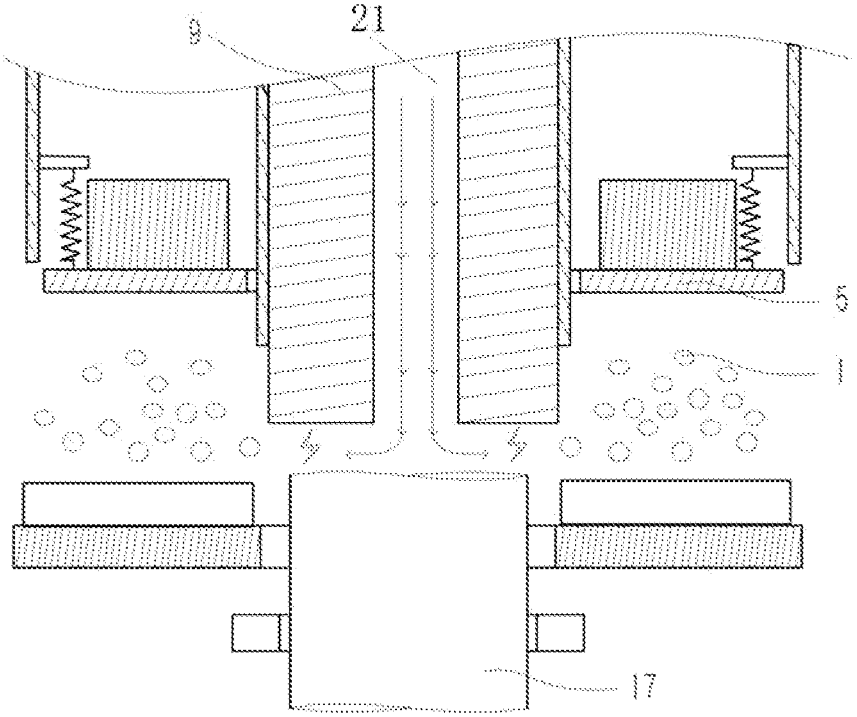
FIG. 4 is a schematic structural diagram showing a situation that the raw materials are bar materials in the disclosure.

The raw materials 3 can be wire materials 18 or bar materials 17 (as shown in FIG. 4), the bar materials 17 as the raw materials increase a contact area between the raw materials and the rotating electrodes 9 and improve a stability of generation of the metal droplets 1.

Figure 5:
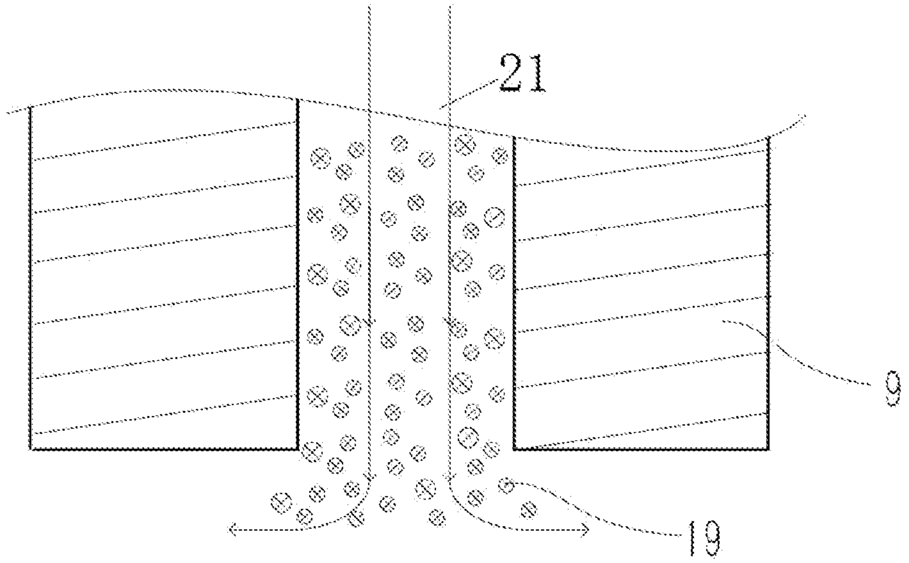
FIG. 5 is a schematic diagram of mixing of gas and powder as a transmission medium in the disclosure.
Figure 6:
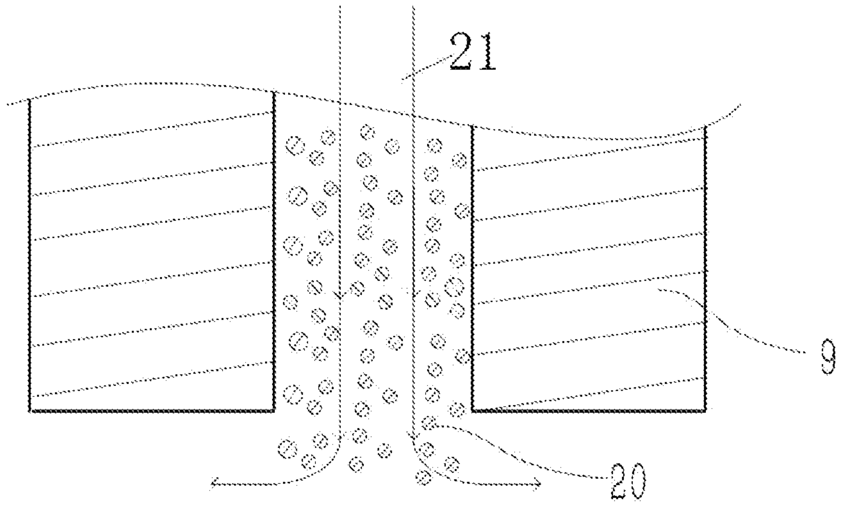
FIG. 6 is a schematic diagram of mixing of gas and liquid as the transmission medium in the disclosure.

There are three ways in which the metal droplet 1 can be transported by the transmission medium 10, as shown in FIG. 1 and FIGS. 5-6. The transmission medium 10 is one of gas (FIG. 1), a mixture of gas and powder 19 (FIG. 5) and a mixture of gas and liquid 20 (FIG. 6).

In an illustrated embodiment, the transmission medium 10 is designed as the mixture of the gas and the powder 19 to improve an efficiency of generation of the metal droplets 1.

In an illustrated embodiment, the liquid 20 is a liquid cooling medium to increase a cooling rate of the metal droplets and increase an amorphous content.

The manufacturing device includes a shell 7, and the rotating electrodes 9 are arranged inside the shell 7 through support shafts 11.

Flexible connectors 6 are arranged between the flying plate 5 and the shell 7 to provide an elastic force for the flying plate 5 so that the flying plate can be retracted.

The driving assembly includes a driving motor 1202, the driving motor 1202 drives the rotating electrodes 9 to rotate through a tapered tooth structure, and the driving motor 1202 is fixed to the shell 7. An end of the driving motor 1202 is fixed to an inner side of the shell 7, another end (i.e., an output end) of the driving motor 1202 drives a bevel gear 1201 to rotate, the rotating electrodes 9 are fixed inside a second bevel gear 12, and the second bevel gear 12 is engaged with the first bevel gear 1201. The driving motor 1202 drives the first bevel gear 1201 to rotate, the rotation of the first bevel gear 1201 drives the second bevel gear 12 to rotate, and the rotation of the second bevel gear 12 drives the rotating electrodes 9 to rotate.

The transmission medium channel 21 is provided with a valve 13, the valve 13 is used to control the transmission medium 10.

The disclosure utilizes the pulse power supply 16 to generate the metal droplets 1 from the raw materials 3 under the action of the one of the electric spark and the short electric arc, and the metal droplets 1 are transported below the flying plate 5 under the action of the transmission medium 10, so as to prepare for the magnetic field force generated by the electromagnetic pulse coils 15 to drive the flying plates 5 to impact the metal droplets 1 onto the surfaces of the substrates 2 to thereby form the dense amorphous nanocrystalline composite materials.

In the disclosure, the substrates 2 can be selected to be disposed on substrate bases or separately, but it should be ensured that positions of the substrates 2 correspond to that of the flying plate 5 to complete the flying plate 5 to impact the metal droplets 1 onto the surfaces of the substrates 2, thereby forming the dense amorphous nanocrystalline composite materials The flying plate 5 is disposed above the substrates 2 and can be fixed through a fixed seat, or other fixing methods in the field can be selected for fixation, and there are no special requirements for fixation.

Figure 3:
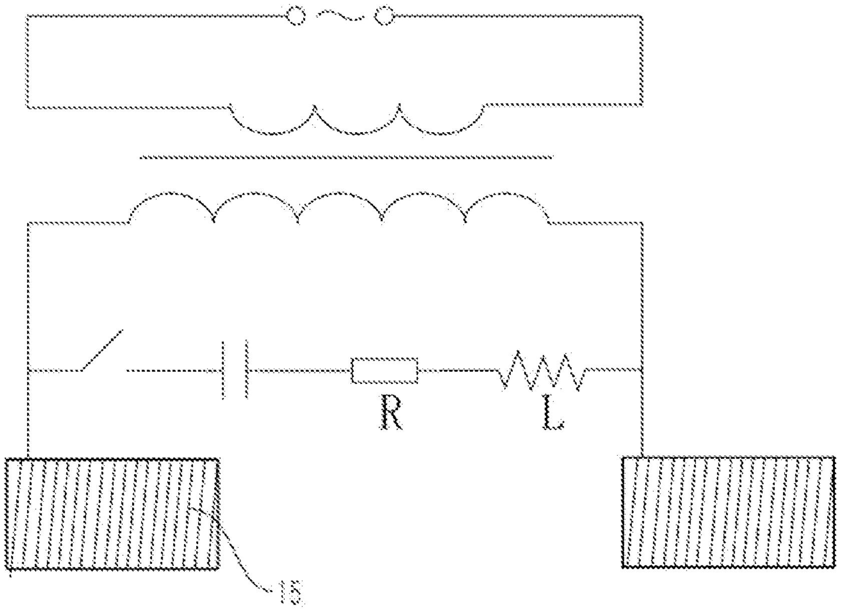
FIG. 3 is a schematic circuit diagram of an electromagnetic force generated by electromagnetic pulse coils in the disclosure.

In an illustrated embodiment, the electromagnetic pulse coils 15 on the flying plate 5 are controlled by a radio link control (RLC) oscillation circuit composed of a capacitor, coils and a discharge circuit to generate an electromagnetic force. The specific schematic circuit diagram of the RLC oscillation circuit is shown in FIG. 3 and the specific principle is as follows.

The process principle of the electromagnetic pulse is to use a high-voltage capacitor to discharge the electromagnetic pulse coils 15 instantaneously to form a pulse current, so that eddy currents can be generated in the conductive flying plate adjacent the coils, a corresponding instantaneous strong magnetic field can be generated, and a mutually repulsive magnetic field force that changes with time will be generated between the electromagnetic pulse coils 15 and the flying plate 5. Under the effect of the magnetic field force, the flying plate 5 can impact the metal droplets 1 on the surfaces of the substrates 2 at a high speed to form the amorphous nanocrystalline composite materials.

The feeding mechanism 4 can be a conventional feeding mechanism in the field, and there are no special requirements for the feeding mechanism 4. The feeding mechanism 4 can be connected to the manufacturing device or set independently.

The transmission medium channel 21 is used to transport the transmission medium so that the metal droplets 1 can be transported below the flying plate 5. The transmission medium channel 21 can be set separately or disposed on the manufacturing device, and there are no special requirements for the transmission medium channel 21.

Taking a device with the rotating electrodes 9 as an example, the manufacturing method and the manufacturing device of the disclosure are illustrated as follows.

Under the action of the feeding mechanism 4, the raw materials 3 continuously approaches the rotating electrodes 9. The rotating electrodes 9 are driven by the support shafts 11, the drive motor 1201, the first bevel gear 1202, the second bevel gear 12 to rotate continuously and forming the short electric arc with the raw materials 3 which is continuously approaching, and the raw materials 3 melt to generate the metal droplets 1 under the action of the short electric arc. The metal droplets 1 are blown away by the transmission medium 10 under the action of the valve 13 and are transported below the flying plates 5. Under the magnetic field force generated by the electromagnetic pulse coils, the flying plate 5 impacts the metal droplets 1 on the surfaces of the substrates 2 at the high speed to form the amorphous nanocrystalline composite materials.

The high-speed impact of the flying plate 5 onto the metal droplets 1 causes the droplets to deform and spread on the surface of the substrate 2 while undergoing extremely rapid cooling due to heat transfer to the substrate and any optional cooling medium. This rapid solidification suppresses crystallization and promotes formation of an amorphous or nanocrystalline structure, thereby yielding the amorphous nanocrystalline composite material.

The above are only specific embodiments of the disclosure. However, the scope of protection of the disclosure is not limited to this. Any equivalent substitution or change and the improved concept thereof made by those skilled in the art within the scope of the technology disclosed herein according to the technical solutions of the disclosure shall be included within the scope of protection of the disclosure.

What is claimed is:

1. A manufacturing device of amorphous nanocrystalline composite materials, comprising: a pulse power supply (16), substrates (2), a flying plate (5), a transmission medium channel (21), rotating electrodes (9), and a feeding mechanism (4);

wherein the pulse power supply (16) is electrically connected to the rotating electrodes (9) to form one of an electric spark and an electric arc between the rotating electrodes (9) and raw materials and configured to generate metal droplets from the raw materials under an action of one of the electric spark and the electric arc, the substrates (2) are arranged on both sides of the raw materials, the flying plate (5) is disposed above the substrates (2), the transmission medium channel (21) is configured to allow a transmission medium (10) to pass through, the transmission medium (10) is configured to transport the metal droplets below the flying plate (5), the feeding mechanism (4) is configured to transfer the raw materials, the flying plate (5) is provided with electromagnetic pulse coils (15), and the electromagnetic pulse coils (15) generate a magnetic field force to drive the flying plate (5) to impact the metal droplets onto surfaces of the substrates (2), thereby causing the metal droplets to rapidly solidify and cool upon impact to form the amorphous nanocrystalline composite materials.

2. The manufacturing device as claimed in claim 1, comprising a driving assembly configured to drive the rotating electrodes (9);

wherein two ends of the pulse power supply (16) are correspondingly connected to the rotating electrodes (9), the metal droplets are generated under the action of the one of the electric spark and the electric arc formed between the raw materials and the rotating electrodes (9).

3. The manufacturing device as claimed in claim 1, wherein two ends of the pulse power supply (16) are correspondingly connected to two different raw materials, and the metal droplets are generated by the action of the one of the electric spark and the electric arc formed between the two different raw materials.

4. The manufacturing device as claimed in claim 1, wherein the transmission medium (10) is one of gas, a mixture of gas and powder, and a mixture of gas and liquid.

5. The manufacturing device as claimed in claim 2, wherein the rotating electrodes (9) are sleeved with an insulator layer (8).

6. The manufacturing device as claimed in claim 2, comprising a shell (7), wherein the rotating electrodes (9) are disposed inside the shell (7) through support shafts (11).

7. The manufacturing device as claimed in claim 6, wherein flexible connectors (6) are arranged between the flying plate (5) and the shell (7).

8. The manufacturing device as claimed in claim 6, wherein the driving assembly comprises a driving motor (1202), the driving motor (1202) drives the rotating electrodes (9) to rotate, and the driving motor (1202) is fixed to the shell (7).

9. The manufacturing device as claimed in claim 1, wherein the transmission medium channel (21) is provided with a valve (13).

10. The manufacturing device as claimed in claim 8, wherein an end of the driving motor (1202) is fixed to an inner side of the shell (7), while an other end of the driving motor (1202) drives a first bevel gear (1201) to rotate, the rotating electrodes (9) are fixed inside a second bevel gear (12), the second bevel gear (12) is engaged with the first bevel gear (1201); and the other end is an output end.

11. The manufacturing device as claimed in claim 1, wherein the raw materials (3) are wire materials (18).

12. The manufacturing device as claimed in claim 1, wherein the raw materials (3) are bar materials (17).

* * * * *